Feb. 2, 1965  J. CZULAK  3,167,862
METHOD AND APPARATUS FOR MANUFACTURING
CHEDDAR, CHESHIRE OR LIKE CHEESE
Filed April 1, 1963  7 Sheets-Sheet 5

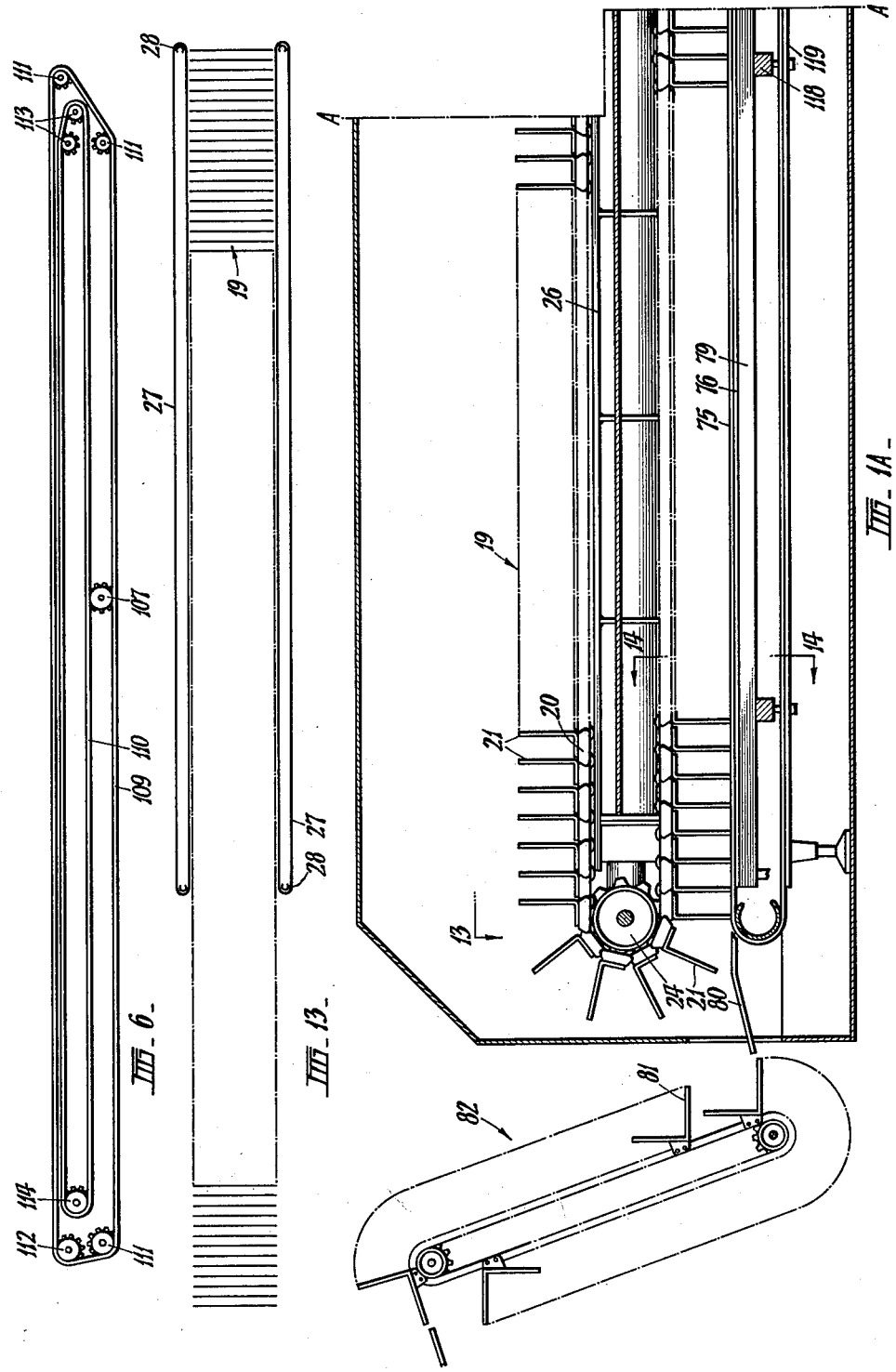

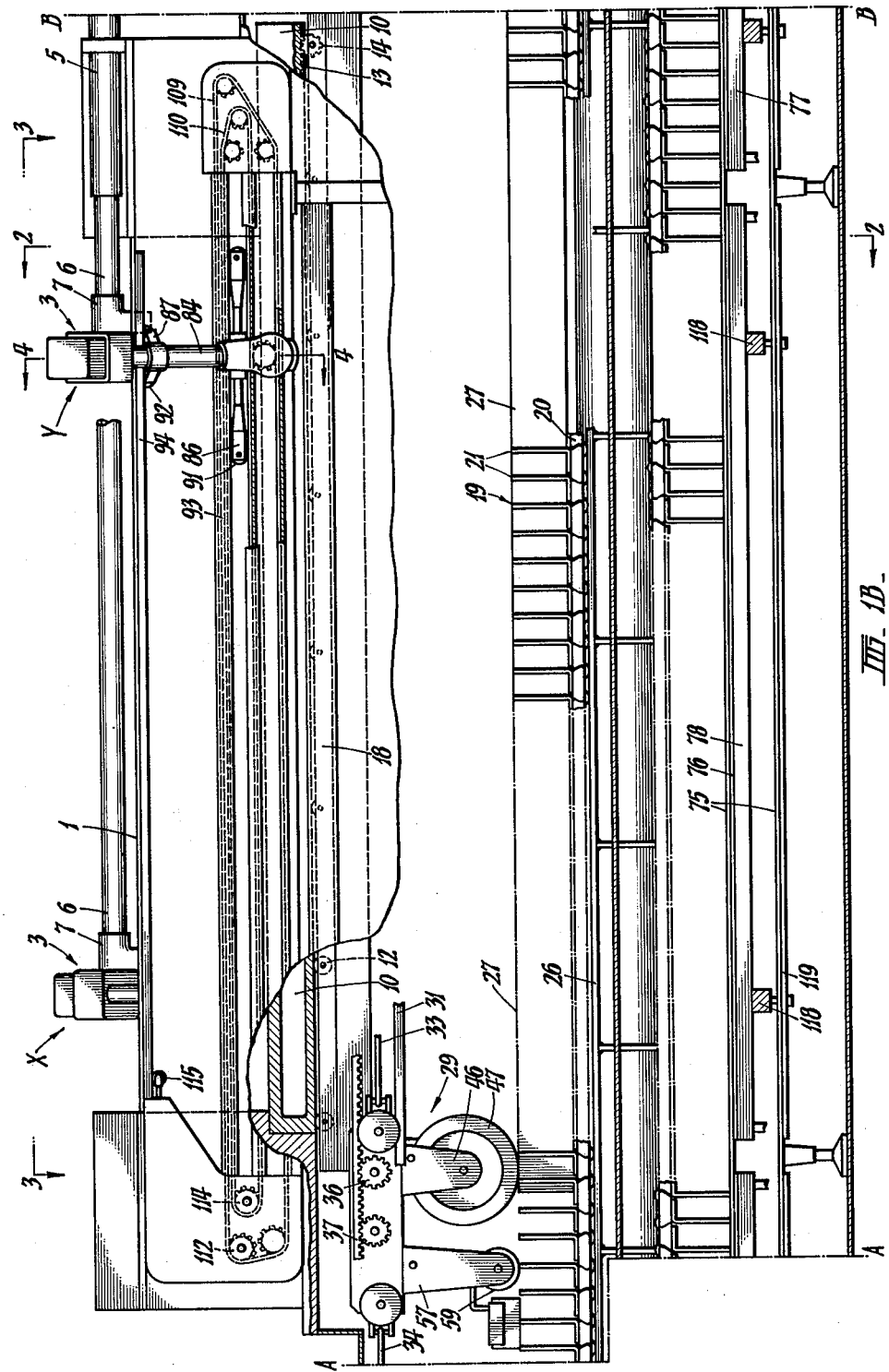

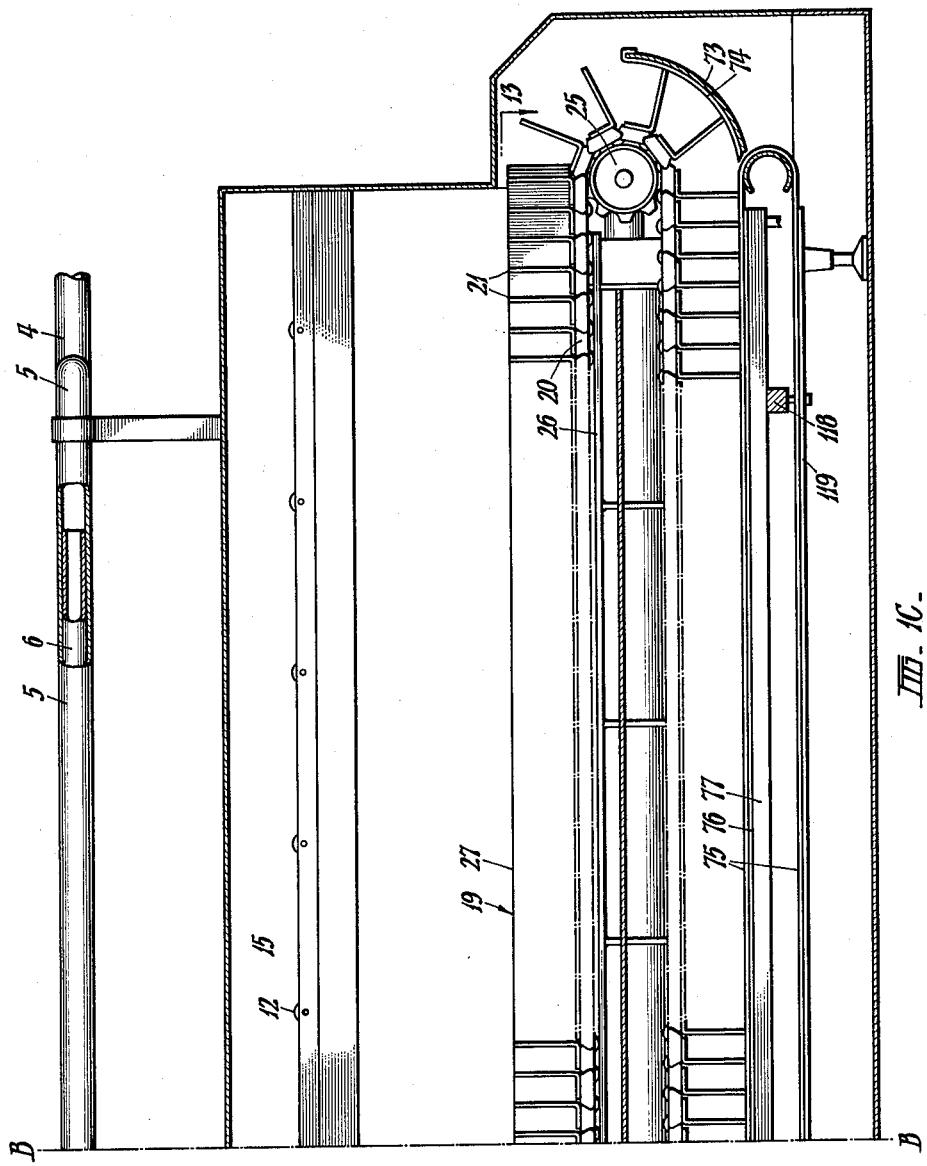

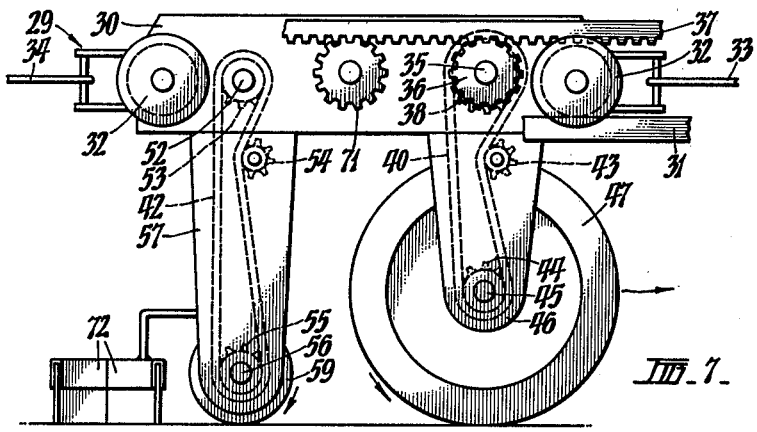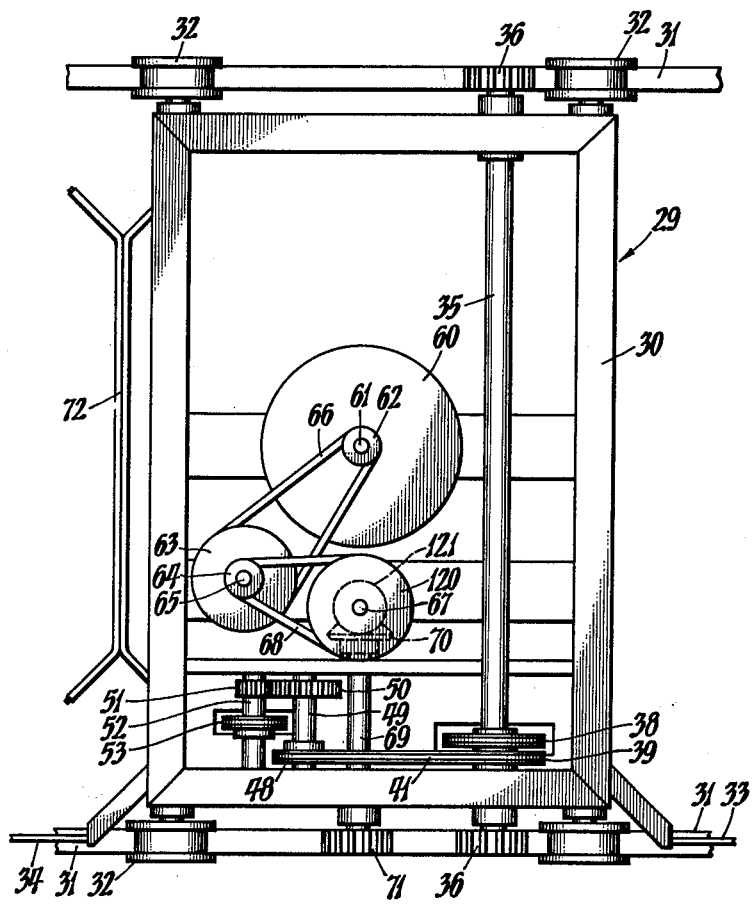

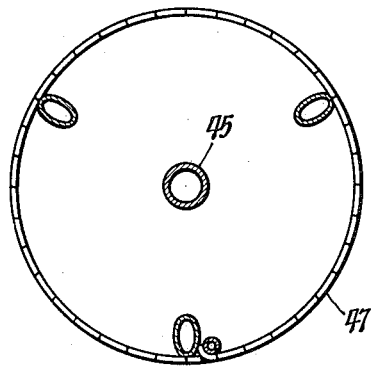
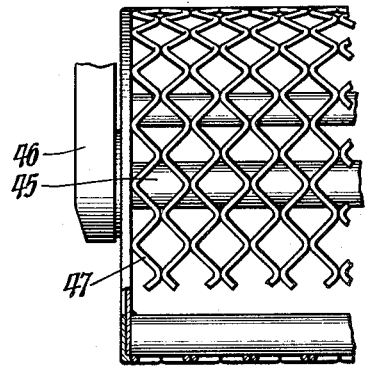
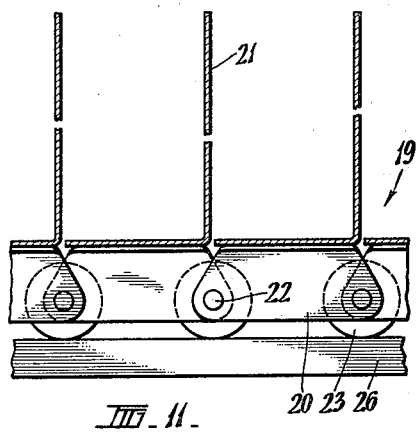
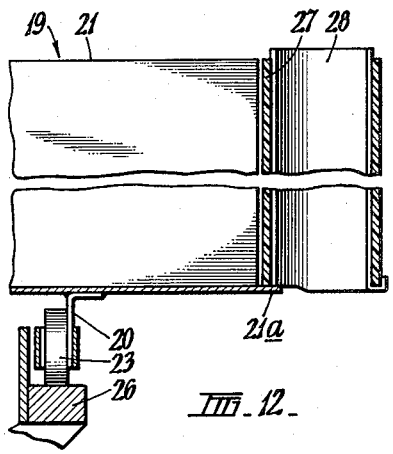
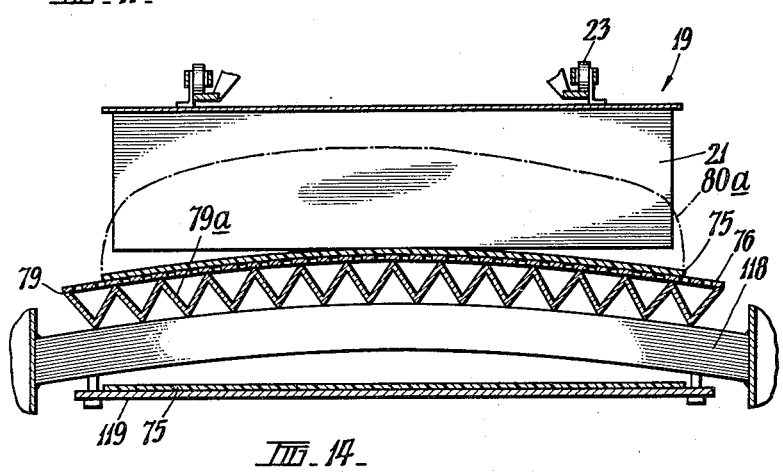

United States Patent Office 3,167,862
Patented Feb. 2, 1965

3,167,862
METHOD AND APPARATUS FOR MANUFACTURING CHEDDAR, CHESHIRE OR LIKE CHEESE
Joseph Czulak, Mount Eliza, Victoria, Australia, assignor to Commonwealth Scientific and Industrial Research Organization, East Melbourne, Victoria, Australia, a body corporate
Filed Apr. 1, 1963, Ser. No. 269,688
Claims priority, application Australia, Mar. 30, 1962, 15,983/62
21 Claims. (Cl. 31—49)

This invention relates to an improved method for manufacturing Cheddar, Cheshire or like cheese, and to apparatus for carrying out this method.

In cheeses of the above type, a common defect is the presence of irregularly shaped holes of various sizes (hereinafter referred to as "mechanical openings") which are caused by the failure of individual curd particles to pack closely and join together along all their surfaces. J. Czulak and L. A. Hammond have previously shown that the occurrence of these mechanical openings in cheeses of the above type was due to the presence of entrapped air (see The Australian Journal of Dairy Technology, April–June 1956, pages 58–65). The authors concluded that the effect of cheddaring was the substitution of large strips of curd for small granules so that fewer air pockets would result on compression.

As a result of this investigation, curd fusing machines were developed with the idea of improving the efficiency of the cheddaring step. Such a machine is described in our Australian Patent No. 237,614. In these machines, the curd was subjected to mechanical compression in order to produce deformation and flow whereby a fibrous structure was developed which would not fall apart or crumble into smaller particles in the subsequent milling, salting and hooping operations.

It has now been found, however, that it is no longer necessary to carry out the cheddaring operation either manually accorrding to the traditional methods or mechanically by using a suitable curd-fusing machine.

According to this invention, we provide an improved process for the manufacture of Cheddar or like cheese, in which granular curd is converted into a fused, partly fibrous mass by gravitational force, and in which the uniformity of the said conversion is enhanced by inverting the mass at some stage of the conversion to allow the gravitational force to act on the mass in the opposite direction.

According to a preferred feature of the invention, the curd is subdivided into slabs which are small enough to allow efficient drainage of the whey therefrom without further cutting. For this reason the slabs should not exceed about 6 inches in width.

According to a further preferred feature, the development of the fibrous structure is assisted by supporting the slabs on an upwardly convex surface so that the curd is induced to spread and flow under the action of gravity whereby stretching occurs.

The invention also includes apparatus for converting granular cheese curd into a fused, partly fibrous mass comprising a series of compartments to hold partly drained curd, means to invert the series of compartments after the curd has partly consolidated therein, and means providing a floor to the inverted compartments, the inverted compartments allowing the curd to spread and flow therefrom under the action of gravity.

The invention further includes apparatus for converting granular cheese curd into a fused, partly fibrous mass comprising a compartmented endless conveyor having an upper span and a lower span, means to deposit partly drained curd into compartments of the upper span, the conveyor being adapted to be driven whereby the curd-carrying compartments of the upper span are transferred to the lower span and thereby inverted, and means providing a floor to the inverted compartments, the inverted compartments allowing the curd to spread and flow therefrom under the action of gravity.

Preferably the curd is partly drained in a drainage vat situated above the conveyor and provided with a retractable floor whereby partly drained curd can be transferred directly from the vat to the conveyor by withdrawing the floor of the vat.

The compartments in the endless conveyor into which the partly drained curd is deposited may be formed by L-shaped slats which define the floors and partition walls of the compartments. During travel of the compartments along the upper span of the conveyor, the side walls may be formed by endless flat belts supported on projecting portions on each side of the slats.

To assist drainage of liquid from the curd in the various compartments, the conveyor may be arranged to slope gently downwards along its length whereby liquid drainage can take place through the spaces between successive slats.

After the partly drained curd has been deposited in the compartments, the top surface of the curd may be levelled off by means of a device comprising at least one perforated drum which is positively rotated as it is drawn across the top of the compartments. Preferably the levelling device carries a flywheel adapted to counteract fluctuations in the speed of travel of the levelling device across the surface of the curd.

After transfer of the compartment to the lower span of the conveyor whereby the compartments are inverted, the curd therein may be supported on an endless belt which passes along the lower side of the lower span of the conveyor and is drawn along in unison with the conveyor by the frictional engagement of the curd in the inverted compartments with the upper surface of the belt. To reduce frictional forces, the belt may be slidably supported on the surface of one or more water tanks which provide a friction-reducing film of water between the belt and the supporting surface.

The invention will now be described more fully, by way of example, with reference to the accompanying drawings, in which:

FIGURES 1A, 1B and 1C, when joined together at the lines A—A and B—B, show a partly sectioned side elevation of a cheese curd fusing machine in accordance with the invention.

Figure 2:
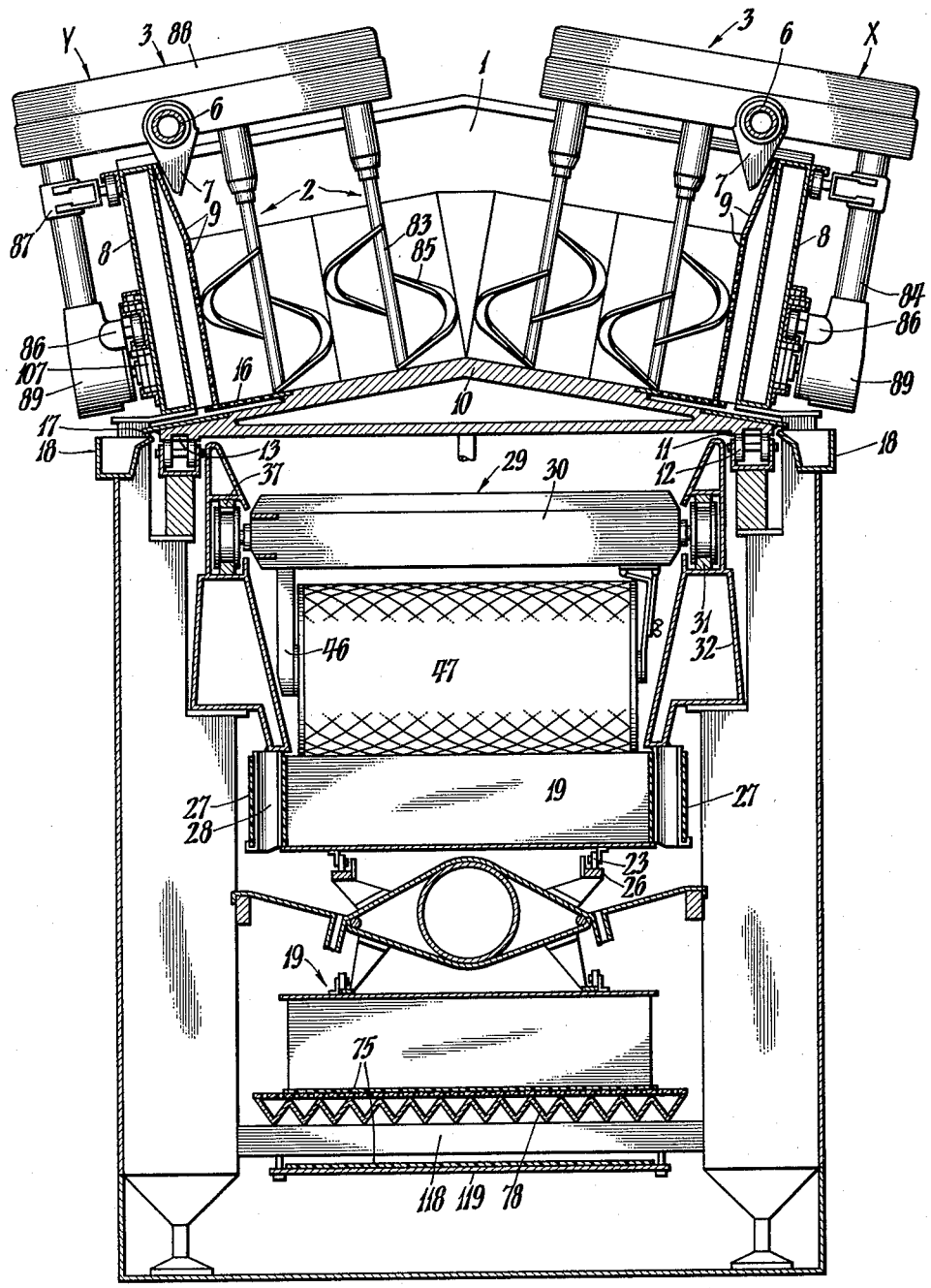
FIGURE 2 is a cross-sectional view on the line 2—2 in FIGURE 1B, but on an enlarged scale.

FIGURE 6 is a side elevation of the stirrer drive arrangement shown in FIGURE 1B, FIGURE 7 is an enlarged and more detailed side elevation of portion of the machine shown in FIGURE 1B, FIGURE 8 is a plan view of the mechanism shown in FIGURE 7, FIGURE 9 is a cross-sectional view of the levelling drum shown in FIGURES 1B, 2 and 7, FIGURE 10 is an enlarged fragmentary view in front elevation of the levelling drum shown in FIGURE 9, the lower part of the drum surface being broken away, FIGURE 11 is an enlarged, broken view in part-sectional side elevation of part of the conveyor system shown in FIGURES 1A, 1B and 1C, FIGURE 12 is a fragmentary sectional view taken at right angles to the view in FIGURE 11, FIGURE 13 is a schematic diminished part plan view on the line 13—13 in FIGURES 1A, 1B and 1C, and FIGURE 14 is a cross-sectional view on the line 14—14 in FIGURE 1A.

The machine shown in the drawings, and its operation, will now be described. A drainage vat, denoted generally as 1, includes a pair of box-section, longitudinal outer walls 8, a pair of perforated, longitudinal inner walls 9, and a retractable floor 10. The retractable floor is hollow so that water may be circulated through it, and has on its underside projections 11 by which it is supported on rollers 12. A rack 13, mounted on the retractable floor between the projections 11 and extending over the length of the retractable floor, meshes with a pinion 14 driven by an hydraulic motor. By means of this rack and pinion drive, the retractable floor may be moved over the supporting rollers 12 from the position shown in FIGURE 1B to occupy the space 15 (FIGURE 1C). Perforated plates 16 and non-perforated plates 17 are connected to, and extend for the complete length of, the retractable floor so that liquid from the vat may drain either through the perforated inner walls 9 or the perforated plates 16 onto plates 17 and thence into the side troughs 18. The perforated plates slidably engage the lower edge of walls 9 and are spaced above the plates 17.

Figure 5:
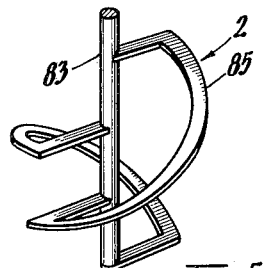
FIGURE 5 is a perspective view of one of the stirrers used in the machine.

The drainage vat 1 is provided with two stirrer assemblies indicated generally as X and Y and which reciprocate longitudinally within the vat in such manner that they are always travelling in opposite directions. Each assembly includes a pair of stirrers 2 of a shape best shown in FIGURE 5. Each stirrer consists of a drive shaft 83 carrying a pair of stirrer blades 85 each of which has horizontal upper and lower portions and a sloping curved portion connecting the outer ends of the horizontal portions. Such a shape of the stirrer blades has been found by experiment to provide the most efficient stirring action. Each stirrer assembly includes a stirrer head casing 3, tubular housing 84 depending therefrom, extension arms 86, 87, cover 88, stirrer drive casing 89 and bearing cap 90. The extension arms 86 and 87 are fitted with wheels 91, 92 respectively by means of which the stirrer assembly may run in metal pressings 93, 94 which are rigidly attached to one of the longitudinal walls 8 of the vat. A pair of the stirrers 2 and a drive shaft 95 are rotatably mounted in the stirrer head casing 3 by means of bearings 96, 97 respectively. Torque may be transmitted to the stirrers from shaft 95 by means of V-grooved pulleys 98, 99, 100 and endless V-belts 101, 102. Bevel gears 103, 104 are mounted in the stirrer drive casing 89 and each is connected to shaft 95 by a separate "one-way" clutch such that if either of said bevel gears 103, 104 is rotated in a direction which is clockwise when viewed from above, the shaft 95 will also be rotated clockwise, but if either of the bevel gears is rotated anticlockwise then it freely rotates on the shaft 95. Shaft 105, which is rotatably mounted in the stirrer drive casing 89 by means of roller bearing 106, carries a chain sprocket 107 and bevel gear 108 which meshes with both bevel gears 103 and 104.

The chain sprocket 107 through which torque is transmitted to the stirrer shafts 83, is itself driven by a system of chains best illustrated in FIGURE 6. As shown therein, sprocket 107 engages with chains 109, 110. Chain 109 passes around idler sprockets 111 and driven sprocket 112, while chain 110 passes around idler sprockets 113 and driven sprocket 114. The chains 109, 110 are driven at different speeds and in the same direction, but the speed of each chain is independently adjustable and the direction of travel of both chains may be reversed. Because of its engagement with both chains, sprocket 107 travels in the same direction as the chains with a speed between that of chain 109 and that of 110, and also rotates at a speed which is proportional to the speed differential between the chains. The stirrer assembly travels with the sprocket 107, the rotation of which causes bevel gear 108 to also rotate. The direction of rotation of sprocket 107 and bevel gear 108 will depend on the direction of travel of the chains and also on which of the two chains is travelling the faster. However, because of the "one-way" clutch mountings of the bevel gears 103, 104, the shaft 95, and therefore the stirrers 2, will rotate in a clockwise direction when viewed from above, irrespective of the direction in which the bevel gear 108 is rotating. Thus the stirrers 2 are driven along the vat in a direction which is dependent on the direction of travel of the chains 109, 110 and at a speed which is between that of chain 109 and that of 110 and simultaneously rotate at a speed proportional to the speed differential between chain 109 and chain 110. Since the speeds of rotation of the sprockets 112, 114 may be independently varied, the translational and rotational speeds of the stirrers may be independently adjusted.

Stirrer assembly Y is constructed in the same way as assembly X, but the arrangement is such that the travel of X is out of phase with the travel of Y. The means of driving the pair of chains associated with assembly X and the means of driving the pair of chains associated with assembly Y are interconnected such that assembly X always travels in the opposite direction to, but at the same speed as, assembly Y, and the direction of travel of both pairs of chains are simultaneously reversed by the operation of reversing switches 115. Both switches are mounted at the left hand end of vat 1 (as seen in FIGURE 1B) such that one is operated by contact with assembly X when that assembly reaches the left hand end of the vat and the other is operated by contact with assembly Y when that assembly Y reaches the same end of the vat.

Figure 3:
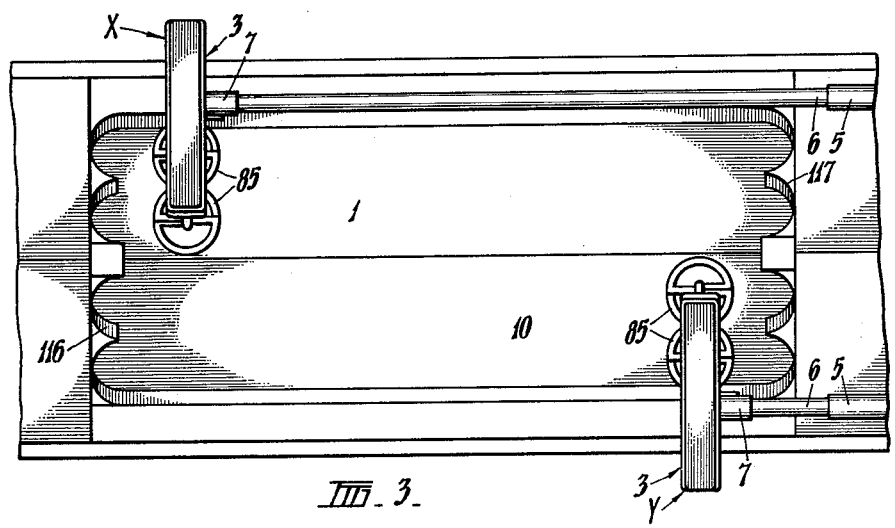
FIGURE 3 is a plan view on the line 3—3 in FIGURE 1B.
Figure 4:
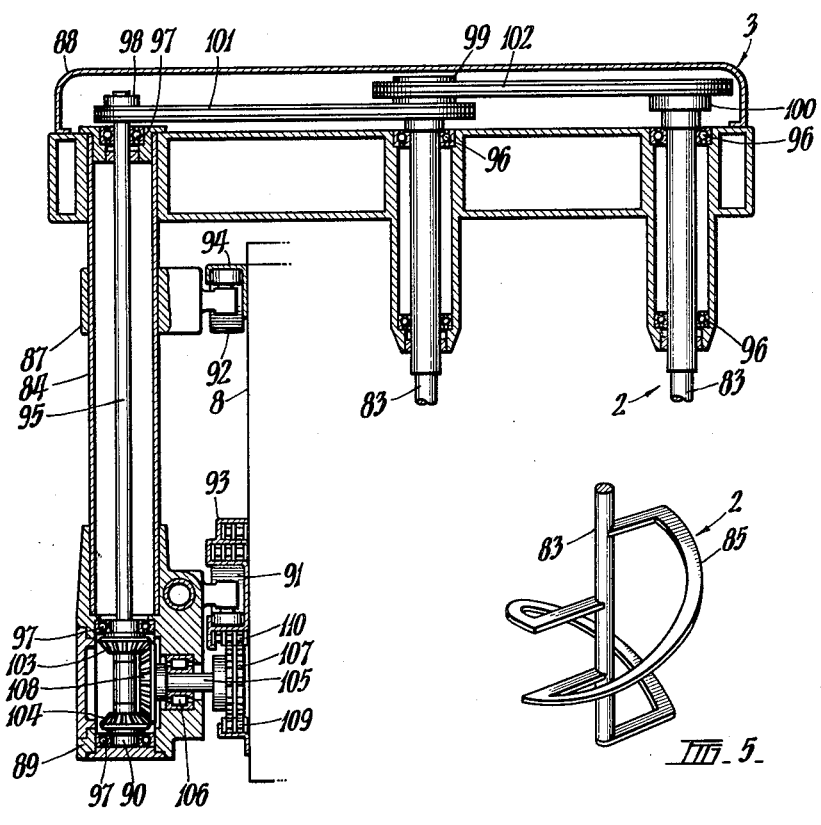
FIGURE 4 is a cross-sectional view on the line 4—4 in FIGURE 1B, but on an enlarged scale.

As will be seen in FIGURE 3, the end walls of the vat 1 are provided in curved recesses 116, 117 which are of size to fit the stirrer blades 85 so that there is virtually no "dead" space within the vat which is not subject to the action of the stirrer blades. The arrangement is such that, as assembly X approaches the left hand end of the vat, assembly Y is approaching the right hand end. As assembly X makes contact with one of the switches 115 the pair of stirrers of assembly X enter the recesses 116 in the left hand end wall of the vat while the pair of stirrers of assembly Y enter the recesses 117 in the right hand end wall. The operation of switch 115 in the path of travel of assembly X causes both assemblies to reverse their direction of travel and a similar direction reversal occurs when assembly Y subsequently contacts the other switch 115. Thus the two pairs of stirrers reciprocate such that they completely traverse the vat 1 and one pair is always travelling in a direction which is opposite to that of the other pair. While thus traversing the vat in each direction, each stirrer 2 rotates in a direction which is always clockwise when viewed from above.

Feed material is introduced into the vat 1 via inlet pipe 4 which splits into two branches 5. Inner tubes 6, which telescope within the branches 5, are connected to feed nozzles 7 which are mounted at an angle to the top portions of the perforated walls 9. The feed nozzles 7 are mounted on the stirrer head casings 3 and therefore reciprocate with the stirrer assemblies.

In carrying out the process of the invention, material in the form of small pellets of curd in whey is fed into vat 1 with the retractable floor 10 in the position shown in FIGURE 1B. This material is then continuously stirred while liquid is allowed to drain through the perforated inner walls 9 and the perforated plates 16 to the side troughs 18. Since the nozzles 7 are mounted at an angle to deliver the curd and whey slurry against the perforated walls 9 as shown in FIGURE 2, a high degree of separation of the whey from the curd takes place along the top portions of the perforated walls. This ensures that the curd needs less mechanical stirring than would otherwise be required to free the whey from the curd and also provides a self-cleaning action on the perforations in the walls 9. While the curd is thus being dried or firmed, its temperature is controlled by the circulation of warm water through the hollow retractable floor 10. When the initial drying or firming is complete, the retractable floor 10 is moved into space 15 by means of its rack and pinion drive. The drained curd is thus discharged in a body from the vat.

Situated below the vat is a slat conveyor 19 which includes an endless chain of plate links 20 on which are mounted L-sectioned slats 21, and which are interconnected by pins 22 on which rollers 23 are rotatably mounted. The rollers 23 engage the teeth of a sprocket 24, which is driven clockwise in the view shown in FIGURE 1A by an hydraulic motor, and idler sprocket 25.

The upper span of conveyor 19 is supported by rails 26 on which the rollers 23 run. Over the upper span of the conveyor 19, the horizontal and vertical legs of the L-shaped slats 21 define the floors and partition walls of rectangular prismatic open-topped compartments, into a number of which the drained curd falls after release from the drainage vat 1. The sides of these compartments are closed by endless plastic flat belts 27 arranged in vertical planes and slidably mounted on curved plates 28. The horizontal legs of the L-shaped slats are of greater width than the vertical legs so as to form projections 21a which support those spans of the flat belts 27 which define the compartment side walls. In use the plastic belts 27 are caused to travel with the L-slats by the frictional grip of the cheese curd within the compartments. Each curd compartment is 9" deep, 4" wide and 36" long, which size ensures efficient drainage without further cutting.

After the drained curd is discharged from vat 1 into those compartments directly under the vat, the top surface of the curd is levelled off by means of a levelling device denoted generally as 29 in FIGURE 1B, and which will now be described with reference to FIGURES 2, 7, 8, 9 and 10.

This device consists of a travelling frame 30 which runs on rails 31 which are rigidly mounted on frame 32. Rotatably mounted on frame 30 is a shaft 35 at the ends of which are mounted gear wheels 36 which mesh with racks 37. Equi-diameter sprockets 38, 39 are drivably mounted on shaft 35 and mesh with endless chains 40, 41 respectively. Chain 40 also meshes with jockey sprocket 43 and sprocket 44. The latter is mounted on shaft 45 which is rotatably mounted on brackets 46 rigidly secured to the frame 30. The shaft 45 also drivably carries primary levelling drum 47. Chain 41 meshes with sprocket 48 which is smaller than sprocket 39 and is mounted on shaft 49. This shaft is rotatably mounted on the travelling frame 30 and also drivably carries gear 50 which meshes with a smaller gear 51. This gear is mounted on shaft 52 which is itself rotatably mounted on frame 30 and also drivably carries sprocket 53. Endless chain 42 meshes with sprocket 53, jockey sprocket 54 and sprocket 55 which is mounted on shaft 56. Shaft 56 is rotatably mounted on brackets 57 and also carries secondary levelling drum 59.

Traction ropes 33, 34 are attached to opposite sides of travelling frame 30 to enable the levelling device to be operated in either direction as desired.

When the frame 30 is drawn along the rails 31, the gears 36 are rotated because of their mesh with fixed racks 37. The axle 35, and sprockets 38, 39 also rotate. Sprocket 38 drives sprocket 44 by means of chain 40, thus causing primary levelling drum 47 to rotate whilst it is travelling with the frame 30. Sprocket 39 drives the sprocket 56 by means of chain 41, sprocket 48, shaft 49, gears 50, 51 shaft 52, sprocket 53 and chain 42, thereby causing secondary levelling drum 59 to rotate in the opposite direction to drum 47 while travelling with the frame 30. As will be realised from FIGURES 7 and 8, the secondary levelling drum 59 will be driven at a higher rotational speed than the primary drum 47.

In order to restrict fluctuations in the travelling speed of the frame 30, and therefore in the rotational speed of the drums 47 and 59, a flywheel 60 is fitted to frame 30. The flywheel 60 is mounted on vertical shaft 61 which is rotatably mounted on frame 30, and carries V-grooved pulley 62. V-grooved pulleys 63 and 64 are mounted on vertical shaft 65 which is rotatably mounted on frame 30, pulleys 62 and 63 being connected by V-belts 66. V-grooved pulley 120 and bevel gear 121 are both mounted on vertical shaft 67, and endless V-belt 68 passes around pulleys 64, 120. Horizontal shaft 69 carries bevel gear 70 which meshes with gear 121, and spur gear 71 which meshes with one of the racks 37. When the frame 30 is drawn along the rails 31 by either of the ropes 33, 34, gear 71 is rotated because of its mesh with the rack. Flywheel 60 is therefore also rotated by means of the bevel gear and V-belt drive described above. Any fluctuation in the speed of travel of the frame 30 is thus opposed by either a driving or braking effect of the flywheel acting through gear 71 on the rack.

After the drained curd falls into those conveyor compartments directly under the vat, the levelling device is drawn from the position shown in FIGURE 1B towards the right. The drums 47, 59 therefore rotate, drum 47 in an anticlockwise direction, and drum 56 in a clockwise direction and at a greater speed of rotation than drum 47. The peripheral surface of each drum is constructed of wire mesh. Therefore as either of the drums passes over compartments in which curd is heaped above the top of the compartments, the protruding curd passes through, and is cut off by, the mesh strands and then retained within the drum until the drum reaches a compartment in which the curd level is below the top of the compartment walls. Curd within the drum then falls through the mesh into the insufficiently filled compartment. Drum 47 effects a first "rough levelling" and the following smaller and faster rotating drum 59 further levels the curd surface. Blades 72, rigidly mounted on the frame 30, effect a final smoothing of the levelled curd surface.

The levelling device is drawn to the right until the drums 47, 59 and the blades 72, have traversed every compartment into which curd has fallen from the vat 1. The levelling operation is then complete and the levelling device is returned to its original position by means of rope 34.

The conveyor 19, as mentioned above, is driven by means of sprocket 24 and moves continuously during the process at a convenient speed, 1 ft./min. for example. As the compartmented and levelled curd is thus being carried by the upper span of the conveyor 19, the curd is consolidated under its own weight and drains further. To ensure efficient drainage, the conveyor 19 slopes gently downwards towards its left hand end. In this way drainage can take place through the spaces between successive slats 21.

As each curd-carrying compartment passes downwards at the right-hand end of the conveyor, the curd is prevented from falling out of the compartment by means of a curved stationary retaining plate 73, which is provided with a plastic inner covering 74. In this way, the curd in each compartment is brought into an inverted position. After a compartment has passed beyond the plate 74, the curd therein rests on the top span of an endless plastic belt 75 which is slidably mounted on stationary curved plates 76. The upper span of the plastic belt 75 is slidably supported on water tanks 77, 78 and 79. Warm water is passed through these tanks, in order to control the temperature of the curd while it passes along the lower span of the conveyor. The upper surfaces of the water tanks are perforated to provide a lubricating water film between the plastic belt 75 and the upper surfaces of the water tanks. In this way, the frictional forces tending to prevent movement of the plastic belt 75 are reduced to such an extent that the frictional grip of the curd on the belt is sufficient to move the belt with the curd without slippage therebetween. For a purpose to be hereinafter explained, the upper surfaces of the water tanks become increasingly convex in cross-section in the direction of travel of the lower span of the conveyor. Thus tank 77 is flat at its right-hand end while at section 14—14 the tank 79 has the cross-section shown in FIGURE 14. Because of this convexity, the tanks are divided into separate longitudinal water compartments as shown at 79a in FIGURE 14 to maintain a constant water head across their width. In this way a uniform lubricating film of water is provided between each tank and the top span of plastic belt 75. The water tanks are supported by rigid beams 118 which also carry plates 119 upon which slides the lower span of the plastic belt 75.

When a block of consolidated curd reaches plate 80 at the end of the lower span, it is pushed onto the sloping portion of the plate by the following slat 21. The block then slides onto one of the plates 81 of a plate conveyor denoted generally as 82 whereby it is raised and finally tipped into a tearing or shredding device or into a mill of any desired type as is already known in the art, and is thereafter treated as may be required to produce Cheddar, Cheshire or like cheese.

While travelling along the upper span of conveyor 19, the curd in the various compartments, and particularly the curd in the lower ends of the compartments, becomes converted into a fused, partly fibrous mass under the action of its own weight. While travelling along the lower span of the conveyor in the inverted position, the process of conversion is continued, particularly in the portion of the curd which occupied the upper ends of the compartments while travelling along the upper span. In this way, the degree of conversion of the curd to a fused, partly fibrous mass becomes substantially uniform.

It is also to be noted that, while the curd-filled compartments travelling along the upper span of the conveyor are closed on four sides, the compartments in the inverted position are not provided with side walls. Thus, the blocks of partly consolidated curd are free to spread and flow laterally during the movement of the blocks along the lower span of the conveyor. As referred to above, the upper surfaces of the water tanks become increasingly convex in cross-section in the direction of travel of the lower span of the conveyor. This means that the effective floors of the inverted compartments take on an increasingly convex configuration, and this ensures stretching of the curd blocks due to spread and flow through the open sides of the compartments. Thus the shape of a curd block at the stage of the process represented by line 14—14 in FIGURE 1A may be as represented by broken line 80 in FIGURE 14. For reasons well known in the art, this stretching is necessary for producing the desirable fibrous structure in the curd.

From the above, it will be appreciated that apparatus suitable for carrying out the process of the invention comprises means for converting granular curd into a fused, partly fibrous mass by gravitational force without the necessity for the application of mechanically applied compressional forces to curd contained in closed deformation vessels.

Thus the practice of this invention in the art of making Cheddar, Cheshire or like cheese will greatly simplify and cheapen production. Moreover, all previous concepts based on the idea that it was necessary to mechanically or manually work the curd are simplified or rendered obsolete.

I claim:
1. A process for the manufacture of Cheddar or like cheese, comprising the steps of feeding cheese curd in whey in a traversing stream against a perforated wall to effect a substantial separation of the whey from the curd, stirring the curd material to effect further drainage, forming the drained material into a series of slabs each of which is small enough to allow efficient drainage of the whey therefrom, moving the slabs along a predetermined path to allow partial consolidation by gravitational force, curving the path through an angle of approximately 180° to cause inversion of the slabs, supporting the slabs on all sides during inversion, and further moving the inverted slabs along a predetermined path to further consolidate the curd, the slabs while travelling along the last mentioned path being supported on an upwardly convex surface to cause the curd to spread and flow laterally and thereby develop a fibrous structure.

2. Apparatus for converting granular cheese curd into a fused, partly fibrous mass, comprising means defining a series of compartments to hold partly drained curd and including only a single wall between each adjacent pair of compartments, means to invert the series of compartments after the curd has partly consolidated therein, and means providing a moving floor to the inverted compartments, the inverted compartments allowing the curd to spread and flow therefrom under the action of gravity.

3. Apparatus for converting granular cheese curd into a fused, partly fibrous mass, comprising an endless conveyor having an upper run and a lower run, means on said conveyor defining a series of compartments, each adjacent pair of compartments on the conveyor having only a single wall between them, means to deposit partly drained curd into the compartments as the latter move along said upper run, means to drive the conveyor whereby the curd-carrying compartments are transferred from said upper run to said lower run and thereby inverted, and means providing a floor to the inverted compartments movable in unison therewith along said lower run, the inverted compartments allowing the curd to spread and flow therefrom under the action of gravity.

4. Apparatus according to claim 3; wherein said means defining the compartments of the endless conveyor into which the partly drained curd is deposited includes L-shaped slats which form said walls between adjacent compartments and also the floors of the compartments when such compartments are located along the upper run of the conveyor, said slats having drainage openings therebetween.

5. Apparatus according to claim 4; wherein said means defining the compartments along the upper run of the conveyor further includes endless flat belts being movable in unison with the compartments by frictional engagement with the curd inside the compartments, projecting portions on said slats supporting said belts, and continuous vertical plates also supporting said belts.

6. Apparatus according to claim 4; wherein said runs of the conveyor slope gently downwards along their length whereby liquid drainage can take place through the drainage openings between successive slats.

7. Apparatus according to claim 3; wherein said means providing a floor for the inverted compartments comprises an endless belt which passes along the lower side of said lower run of the conveyor and is drawn along in unison with the conveyor by the frictional engagement of the curd in the inverted compartments with the upper surface of the belt.

8. Apparatus according to claim 7; further comprising a water-containing tank underlying the last-mentioned belt and providing a friction-reducing film of water on which said belt is slidably supported.

9. Apparatus according to claim 8; wherein said tank is divided into separate longitudinal compartments.

10. Apparatus according to claim 7; further comprising means defining a surface which is transversely convex and on which the last mentioned belt is supported so that said belt assumes a similar configuration.

11. Apparatus according to claim 10; wherein said transversely convex surface is increasingly transversely convex in the direction of travel of the lower run of the conveyor.

12. Apparatus according to claim 3; and further comprising levelling means operative to level the top surface of the curd after the curd has been deposited in the compartments.

13. Apparatus according to claim 12; wherein said levelling means comprises at least one perforated drum mounted for traversing across the filled compartments.

14. Apparatus according to claim 13; wherein said levelling means further comprises a flywheel connected with said drum to counteract fluctuations in the speed of traversing of said drum across the surface of the curd.

15. Apparatus according to claim 12; wherein said levelling means comprises a pair of positively rotated perforated drums of different sizes mounted to traverse the filled compartments, the smaller of said drums being driven at a faster speed than, and in the opposite direction to, the larger of said drums.

16. Apparatus according to claim 3; and further comprising a drainage vat in which a substantial separation of whey from the curd can be effected prior to deposition of the partly drained curd into the compartments.

17. Apparatus according to claim 16; and further comprising a curd-and-whey delivery nozzle, said drainage vat being provided with a perforated wall against which a curd and whey slurry is delivered from said nozzle whereby a high degree of separation of the whey from the curd is effected.

18. Apparatus according to claim 17; in which said slurry is directed against the perforated wall at an angle to provide a self-cleaning action on the perforations.

19. Apparatus according to claim 16; and further comprising rotatable stirrers and means to reciprocate the stirrers within the vat, said vat having end walls which are curved to conform to the path of the reciprocating movement of the stirrers whereby all of the space within the vat is subject to the action of the stirrers.

20. Apparatus according to claim 16; wherein said drainage vat has a retractable floor.

21. Apparatus according to claim 20; wherein said retractable floor is hollow to allow the circulation of water therethrough.

References Cited by the Examiner

UNITED STATES PATENTS

| 1,861,160 | 5/32 | Morris | 31—20 |
| 2,567,957 | 9/51 | Miollis | 31—49 |
| 3,047,951 | 8/62 | Le Boeuf | 31—45 |

FOREIGN PATENTS

| 32,518 | 11/23 | Denmark. |
| 864,401 | 4/61 | Great Britain. |

SAMUEL KOREN, *Primary Examiner.*

HUGH R. CHAMBLEE, *Examiner.*